Jan. 30, 1951 C. A. BERGFORS 2,540,024
DECADE COUNTER
Filed Nov. 17, 1948
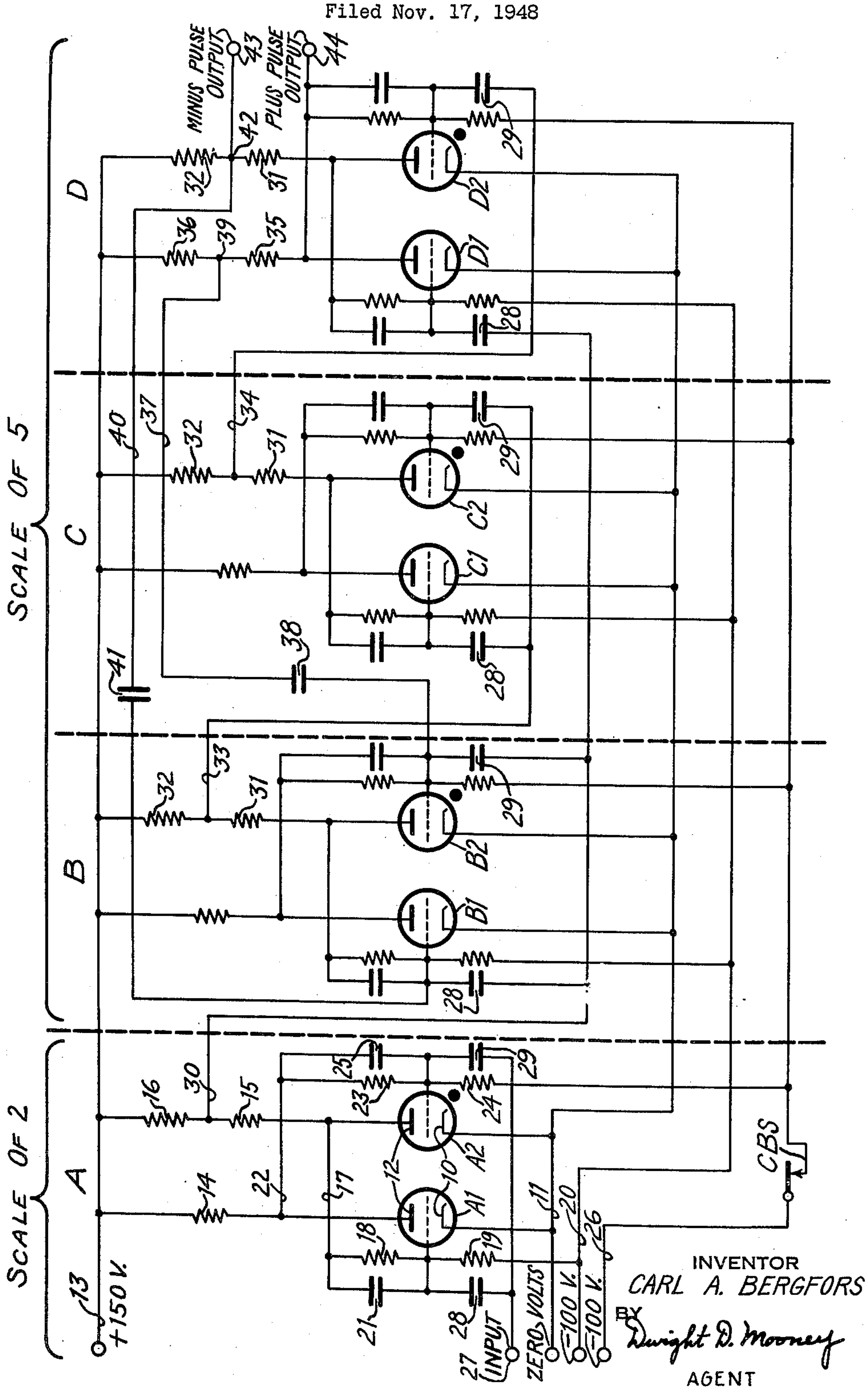
INVENTOR
CARL A. BERGFORS
BY Dwight D. Mooney
AGENT Patented Jan. 30, 1951

2,540,024

UNITED STATES PATENT OFFICE 2,540,024

DECADE COUNTER

Carl A. Bergfors, Yonkers, N. Y., assignor to International Business Machines Corporation, New York, N. Y., a corporation of New York Application November 17, 1948, Serial No. 60,536

2 Claims. (Cl. 250—27)

The present invention relates to counters and more particularly to an electronic counter of the decade type utilizing a series of trigger circuits, each of which comprises a pair of grid controlled tubes.

Each trigger circuit has two conditions of stability, alternately assumed in response to entry pulses of predetermined characteristics. The trigger circuits are inherently binary and the number of pulses counted in one complete cycle of the counter is determined by the number of such trigger circuits used.

It has been discovered that the use of feedback circuits, limits the maximum operating speed of the counter and that the greater the number of times, per cycle of counter operation, that feedback is employed, the lower the maximum counting speed of the counter.

There have been previously provided various feedback arrangements for converting a binary type counter, composed of a cascade series of triggers, to a decade counter. This conversion may be accomplished by feeding back pulses from a higher single trigger circuit to a plurality of lower trigger circuits or from a plurality of higher trigger circuits to a single lower one.

Another arrangement which has been employed for adapting four trigger circuits connected in straight cascade, and thus counting in binary, to effect decade counting, involves the use of positive and negative feedback pulses from the third trigger circuit to the first trigger circuit. Feedback occurs twice, during each complete cycle of counter decade operation, the first three trigger circuits serving as a quinary counter and the fourth trigger circuit functioning as a two counter. The fact that feedback occurs twice, during each cycle of decade counting, places a lower maximum operating limit on the speed of counter operation than would be the case if feedback occurred, only once, during each cycle.

Accordingly, one of the objects of this invention is to provide a novel circuit arrangement for converting an inherently binary counter to a high speed decade counter.

Another object is to provide a decade counter from four inherently binary trigger circuits wherein positive and negative pulses from the fourth trigger circuit are applied, simultaneously, instead of in sequence, to the second trigger circuit, once only, during each cycle of counter operation.

Other objects of the invention will be pointed out in the following description and claims and illustrated in the accompanying drawing, which discloses, by way of example, the principle of the invention and the best mode, which has been contemplated, of applying that principle.

The drawing is a circuit diagram of a modified binary electronic counter illustrating the invention.

Referring more particularly to the drawing, the counter comprises four trigger circuits A, B, C and D, connected, in cascade, and shown in the drawing as separated by broken vertical lines. Each trigger circuit includes a pair of grid-controlled tubes designated respectively as A1 and A2, B1 and B2, C1 and C2 and D1 and D2. The tubes are all of the same type and may, for example, be single tubes such as 6J5's or, if desired, two tubes may be confined in one envelope, as in the dual type tubes. In the latter case, the entire circuit may comprise four 12SN7's.

Each trigger circuit A to D has two conditions of stability which are alternately assumed and designated herein as the "on" and "off" conditions. The "off" condition is assumed to be when the right-hand tube is conductive and the left-hand tube is non-conductive. The "off" condition of the respective trigger circuits, at starting, is indicated in the drawing by a dot to the right of the right-hand or second tube of each trigger circuit. The "on" condition is assumed to be when the right-hand tube is non-conductive and the left-hand tube is conductive.

The arrangement and operation of trigger A will be described with reference to the values of applied voltage and the values of resistances and capacitances. Triggers B, C and D are similar to trigger A except for the differences specified herein. The various values are given to clarify the explanation and it is understood that they may be varied considerably without departing from the principles of the invention.

Cathodes 10 of tubes A1 and A2 are connected to a zero volt line 11 and plates 12 are connected to a +150 volt line 13, the plate of tube A1 being connected to this line through a resistor 14 and the plate of tube A2 through resistors 15 and 16, in series, and having a combined value equal to that of the resistor 14. Resistors 14, 15 and 16 are of 0.02, 0.005 and 0.015 megohm, respectively. A lead 17 connects the plate 12 of tube A2 to the upper end of a voltage divider consisting of resistors 18 and 19 each of 0.15 megohm. The lower end of the divider is connected to a −100 volt bias line 20. A capacitor 21 of 0.0001 microfarad is connected in parallel with the resistor 18.

Similarly a lead 22 connects the plate 12 of tube A1 to the upper end of a voltage divider consisting of resistors 23 and 24 each of 0.15 megohm. A capacitor 25 of 0.0001 microfarad is connected in parallel with resistor 23 and the lower end of the divider is connected to a −100 volt cancel bias line 26 provided with a cancel bias switch CBS to provide for quick resetting of the trigger to the preselected starting condition by simply opening and closing switch CBS. When switch CBS is opened, the grid bias of tube A2 rises slightly above zero bias value and A2 is caused to be conductive. This in turn causes the plate potential of A2 to drop to its low value, as does the grid of A1, causing A1 to be non-conductive. The plate of A1 is therefore at high potential, causing A2 to be maintained in conducting status even after switch CBS is closed.

Input terminal 27 is connected to a source of negative pulses to be counted and having characteristics suitable to actuate trigger A. The negative pulses are conveyed simultaneously to the control grids of tubes A1 and A2, respectively, through capacitors 28 and 29, each of 0.00004 microfarad. A trigger output lead 30 is connected, at one end, intermediate the resistors 15 and 16, and, at its other end, through capacitors 28 and 29 to the control grids of the tubes of trigger B and through a capacitor 28 to the control grid of tube D1 of trigger D. Each time trigger A changes to the "off" condition, a negative pulse of sufficient value to trip trigger B is transferred over the lead 30 to the control grids of the tubes of trigger B and this same negative pulse is impressed on the control grid of tube D1 of trigger D and serves to trip this trigger to "off" status if it was previously turned "on."

When trigger A is in the preselected starting or "off" condition, tube A1 is biased to cut-off according to the well known trigger action. Positive pulses having an amplitude equal to that of the negative pulses to be counted will not affect the status of the trigger because the constants of the trigger circuits and the values of operating voltages are so chosen that positive pulses of an amplitude equal to that of the negative pulse, will not switch the trigger.

When a negative pulse to be counted is applied to the input terminal 27, it has no direct effect on tube A1 because its control grid is already biased below cut-off but it does cause the conductive tube A2 to be rendered substantially non-conductive and its plate voltage to rise rapidly toward that of line 13. The increased plate voltage is transferred from the plate of tube A2 to the control grid of tube A1, through the parallel connected resistor 18 and capacitor 21. The voltage transferred causes the voltage on the control grid of tube A1 to rise whereupon that tube starts to conduct. The resulting voltage decrease at the plate of tube A1 is transferred to the control grid of tube A2 through the parallel connected resistor 23 and capacitor 25 and keeps tube A2 non-conductive. Because of the above described action the first negative pulse trips trigger A from "off" to "on."

The second negative pulse renders tube A1 non-conductive and tube A2 conductive to return trigger A to the "off" condition. The ensuing rise of voltage at the plate of tube A1 is transferred to the control grid of tube A2 through resistor 23 and capacitor 25 to render A2 conductive. While the resulting decrease in voltage at the plate of tube A2 is transferred to the control grid of tube A1 through resistor 18 and capacitor 21, to maintain tube A1 non-conductive.

When trigger A is switched "off" by the second negative pulse, a negative pulse caused by the decrease of the plate voltage of tube A2 is transferred via resistor 15, line 30 and condensers 28 and 29 to the control grids of the tubes of trigger B and, in the manner described in connection with trigger A, switches trigger B "on."

The plate resistors 31 and 32 of tube B2 have values of 0.008 and 0.012 megohm, respectively, as compared to 0.005 and 0.015 megohm, respectively, of the corresponding resistors 15 and 16 of tube A2. The plate resistors of tubes C2 and D2 have values corresponding to those of resistors 31 and 32 of tube B2. These resistance values were determined experimentally and selected to produce optimum circuit operation.

Trigger B output lead 33 is connected, at one end, intermediate resistors 31 and 32 of tube B2 and, at its other end, to the control grids of the tubes of trigger C. A negative pulse is transferred over the lead 33 to trip trigger C each time trigger B trips from "on" to "off." Trigger C output lead 34 is connected, at one end, intermediate the plate resistors 31 and 32 of tube C2 and at the other end to the control grid of tube D2 via a condenser 29. Each time trigger C is tripped from "on" to "off," a negative pulse is impressed on the control grid of the tube D2 and if trigger D is "off," switches it "on."

Plate resistors 35 and 36 of equal value are connected to the plate of tube D1 and have a total value equal to the value of plate resistor 14 of the corresponding tubes A1, B1 and C1. The resistors 35 and 36 each have a value of 0.01 megohm.

A feed-back lead 37 and a capacitor 38 of 0.00004 microfarad connects a point 39 between the resistors 35 and 36 to the control grid of the tube B2. A feed-back lead 40 and a capacitor 41 of 0.00004 microfarad connects a point 42 between the resistors 31 and 32 of tube D2 to the control grid of the tube B1. The resistors 31 and 32 which have values of 0.008 and 0.012 megohm, respectively, thus have a total value equal to that of that of resistors 35 and 36; hence, when trigger D is "off," the total voltage drop across resistors 32 and 31 is substantially equal to that across resistors 36 and 35 when trigger D is "on." However, since resistor 32 is of higher value than its corresponding resistor 36 while the total resistance of 32 and 31, on one hand and of 36 and 39 on the other hand are equal, the voltage at point 42 will be less when trigger D is "off" than the voltage at point 39 when trigger D is "on." Under these conditions optimum operation of the counter, as a whole, is obtained.

The counter output terminal 43 is taken from the point 42.

The following table, wherein X represents "on" condition and O represents the "off" condition, clearly summarizes one complete cycle of counter operation.

| Counter Setting | Trigger Circuits | | | |
|---|---|---|---|---|
| | A | B | C | D |
| 0 | O | O | O | O |
| 1 | X | O | O | O |
| 2 | O | X | O | O |
| 3 | X | X | O | O |
| 4 | O | O | X | O |
| 5 | X | O | X | O |
| 6 | O | X | X | O |
| 7 | X | X | X | O |
| 8 | O | O | O | X |
| 9 | X | O | O | X |
| 0 | O | O | O | O |

The operation of the circuit in response to the first two negative pulses was set out above in detail in the description of the operation of trigger A, and it will be clear from the above table that the second pulse applied to trigger A, turns "off" this trigger which, in turn produces a negative pulse which via line 30 trips trigger B "on" but has no effect on trigger D, since D is "off" and tube D1 is already non-conducting.

The third pulse switches trigger A "on."

The fourth pulse trips A "off" and a negative pulse is transferred over lead 30 to the control grids of the tubes of trigger B to switch it "off" whereupon a negative pulse is transferred over lead 33 to the control grids of the tubes of trigger C to switch it "on." The same negative pulse over line 30 is impressed on the control grid of tube D1, but since trigger D is still "off" and tube D1 is not conducting this negative pulse does not change the condition of stability of trigger D.

The fifth pulse switches trigger A "on."

The sixth pulse switches trigger A "off" and trigger A switches trigger B "on."

The seventh pulse switches trigger A "on."

The eighth pulse switches trigger A "off," trigger A switches trigger B "off," trigger B switches trigger C "off" and trigger C switches trigger D "on." When trigger D is switched "on," tube D1 conducts and a negative pulse is fed back over lead 37 and capacitor 38 to the control grid of conducting tube B2 while, since tube D2 becomes non-conductive, a positive pulse is fed back over the lead 40 and capacitor 41 to the control grid of non-conducting tube B1. These pulses possess positive and negative phase relationships which tend to turn trigger B "on," but are ineffective to do so because trigger B is at this time in the process of turning "off." It should be understood that a trigger cannot be pulsed to reverse its status until after it has reached a quiescent stable status due to the fact that the regenerative buildup of currents and voltages interval to the trigger itself are of sufficient magnitude to override the effects of externally applied impulses.

The ninth pulse switches trigger A "on."

The tenth pulse switches trigger A "off," trigger A causes a negative pulse to be conveyed simultaneously to the control grids of trigger B and to the control grid of tube D1 of trigger D. Trigger D is thereupon switched "off," tube D2 conducts and a negative voltage from point 42 is transferred to one counter output terminal 43 upon receipt of this tenth pulse at the counter input. An output terminal 44 is connected to the plate of tube D1 which becomes non-conductive upon receipt of the tenth pulse at the counter input so that a plus voltage is produced at terminal 44; hence, the tenth pulse applied to the counter input terminal 27 causes a negative voltage to appear on terminal 43 and a plus voltage on terminal 44 when trigger D goes from "on" to "off." Also, when trigger D is switched "off," a positive pulse is fed back over lead 37 and capacitor 38 to the control grid of tube B2. At the same time that this positive pulse is fed to the control grid of tube B2, a negative pulse is fed back over lead 40 and capacitor 41 to the control grid of tube B1.

This simultaneous positive and negative feedback to the respective tubes of trigger B prevents trigger B from being switched "on" in response to the tenth pulse and thus returns the counter to the preselected starting condition with all triggers in the "off" condition. The simultaneous feed-back, of two pulses of opposite polarity, to trigger B, insures accurate operation of the counter at high speeds.

The novel interconnection of the triggers of the counter of this invention produces operation at high speeds. The entire counter consists of a first trigger operated as a scale-of-two counter and three subsequent triggers operated as a scale-of-five counter and responsive to the first trigger. The fact that the scale-of-five counter is required to operate at only one-half the frequency of the first trigger, is an important factor in extending the upper frequency limit to which this counter will respond.

For example, were the feedback arrangement of this invention employed but with the counter arranged as a scale-of-five and scale-of-two counter instead of as a scale-of-two and scale-of-five counter, the highest operating speed of the counter would be only 75,000 cycles per second as compared to the operating speed of 175,000 cycles per second achieved by the novel counter of this invention.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A decade counter comprising four trigger circuits; each circuit having a pair of first and second grid controlled tubes so connected together and arranged that the first trigger operates as a scale-of-two counter and the second, third and fourth triggers together, operate as a scale-of-five counter, each trigger assuming alternately "on" and "off" conditions of stability in response to pulses applied thereto, each of said tubes being placed alternately in the conductive and non-conductive conditions; voltage means for operating said trigger circuits; plate load resistors connected in the plate circuit of each of said tubes; a connection from the plate circuit of the second tube of the first trigger to the control grids of the tubes of the second trigger for switching the second trigger circuit from either condition of stability to the other and from said plate circuit of the second tube of said first trigger to the control grid of the first tube of the fourth trigger for switching the fourth trigger from one chosen condition of stability to the other; a connection from the plate circuit of the second tube of the second trigger to the control grids of the tubes of the third trigger for switching the condition of stability of the third trigger; a connection from the plate circuit of the second tube of the third trigger to the control grid of the second tube of the fourth trigger for switching the fourth trigger to the condition of stability opposite to that to which it is switchable in response to the first trigger; a capacitive connection from the plate circuit of the first tube of the fourth trigger to the control grid of the second tube of the second trigger and a capacitive connection from the plate circuit of the second tube of the fourth trigger to the first tube of the second trigger, these capacitive connections applying simultaneously, pulses of opposite polarity and different amplitude to the control grids of the tubes of the second trigger, to prevent a change in the condition of stability of the second trigger once during each cycle of counter operation.

2. In a decade counter including a series of four interconnected trigger circuits switchable from one stable condition to another in response to negative pulses and arranged so that the first trigger circuit serves as a scale-of-two counter and the second, third and fourth trigger circuits together serve as a scale-of-five counter; each of said trigger circuits having a first and second grid controlled tube; plate load resistors for each of said tubes; means for placing said counter in a preselected stable condition; a first feedback connection from the plate resistor of the first tube of the fourth trigger circuit to the control grid of the second tube of the second trigger circuit and a second feedback connection from the plate resistor of the second tube of the fourth trigger circuit to the control grid of the first tube of the second trigger circuit, these feedback connections applying simultaneously positive and negative pulses of different amplitude to the second trigger circuit when the fourth trigger circuit is changed to one stable condition, thereby to prevent a change in the stable condition of the second trigger circuit.

CARL A. BERGFORS.

REFERENCES CITED

The following references are of record in the file of this patent:

Electronics, June 1944, "A four-tube counter decade," by Potter, pages 110–113, 358 and 360.